United States Patent
Wilde

(10) Patent No.: US 12,197,632 B2
(45) Date of Patent: Jan. 14, 2025

(54) METHOD AND ARRANGEMENT FOR OUTPUTTING A HEAD-UP DISPLAY ON A HEAD-MOUNTED DISPLAY

(71) Applicant: Siemens Aktiengesellschaft, Munich (DE)

(72) Inventor: Robert Wilde, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 106 days.

(21) Appl. No.: 17/425,048

(22) PCT Filed: Jan. 20, 2020

(86) PCT No.: PCT/EP2020/051273
§ 371 (c)(1),
(2) Date: Jul. 22, 2021

(87) PCT Pub. No.: WO2020/156854
PCT Pub. Date: Aug. 6, 2020

(65) Prior Publication Data
US 2022/0091662 A1  Mar. 24, 2022

(30) Foreign Application Priority Data

Jan. 30, 2019 (DE) ...................... 10 2019 201 175.6
Feb. 25, 2019 (DE) ...................... 10 2019 202 512.9

(51) Int. Cl.
*G06F 3/01* (2006.01)
*G02B 27/01* (2006.01)
(Continued)

(52) U.S. Cl.
CPC ............ *G06F 3/011* (2013.01); *G02B 27/017* (2013.01); *G06F 1/163* (2013.01); *G06F 3/017* (2013.01);
(Continued)

(58) Field of Classification Search
CPC .......... G06F 3/011; G06F 1/163; G06F 3/017; G06F 3/04815; G06F 3/012;
(Continued)

(56) References Cited

U.S. PATENT DOCUMENTS

2012/0293506 A1  11/2012  Vertucci et al.
2014/0078176 A1  3/2014  Kim et al.
(Continued)

FOREIGN PATENT DOCUMENTS

| CN | 103946732 A | 7/2014 |
| CN | 104335142 A | 2/2015 |

(Continued)

OTHER PUBLICATIONS

Joost Peters: "Designing a HUD for a Third-Person VR Game", Virtual Reality Developers Conference, Nov. 2016, Vortrag verfügbar als Video am Sep. 1, 2019 im Internet unter https://youtu.be/f8an45s_-qs.
PCT International Search Report and Written Opinion of International Searching Authority mailed Apr. 2, 2020 corresponding to PCT International Application No. PCT/EP2020/051273 filed Jan. 20, 2020.

*Primary Examiner* — Matthew A Eason
*Assistant Examiner* — Chayce R Bibbee
(74) *Attorney, Agent, or Firm* — Schmeiser, Olsen & Watts, LLP

(57) ABSTRACT

A virtual head-up display which is displayed to a user with a head-mounted display, wherein at least some elements of the HUD are displayed substantially stationary in respect of the head's coordinates at the edge of the user's field of vision, even if the head is moved is provided. A tracking device captures at least one hand and/or finger movement by the user as a gesture. The gesture is detected and processed as an interaction with at least one element of the HUD. Direct interaction with the naked hand allows the user to operate, very intuitively, elements of the HUD, even close to his face. Direct interaction with the HUD by means of (Continued)

gestures represents a disruptive break with previous approaches to the implementation of a HUD for VR and AR applications.

11 Claims, 3 Drawing Sheets

(51) Int. Cl.
    *G06F 1/16*     (2006.01)
    *G06F 3/04815*     (2022.01)

(52) U.S. Cl.
    CPC .. *G06F 3/04815* (2013.01); *G02B 2027/0138* (2013.01); *G02B 2027/0178* (2013.01); *G02B 2027/0187* (2013.01)

(58) Field of Classification Search
    CPC .............. G06F 3/04883; G02B 27/017; G02B 2027/0138; G02B 2027/0178; G02B 2027/0187
    See application file for complete search history.

(56) References Cited

U.S. PATENT DOCUMENTS

| | | | |
|---|---|---|---|
| 2014/0282274 A1 | 9/2014 | Everitt et al. | |
| 2015/0084857 A1* | 3/2015 | Kimura | G06F 1/163 |
| | | | 345/156 |
| 2016/0026253 A1 | 1/2016 | Bradski et al. | |
| 2016/0375768 A1* | 12/2016 | Konet | G08G 1/166 |
| | | | 348/148 |
| 2019/0018498 A1* | 1/2019 | West | G06F 3/012 |
| 2019/0369736 A1* | 12/2019 | Rakshit | G06F 3/0426 |

FOREIGN PATENT DOCUMENTS

| | | |
|---|---|---|
| CN | 105408837 A | 3/2016 |
| CN | 105830351 A | 8/2016 |
| JP | 2018142251 A | 9/2018 |
| WO | 2016209604 A1 | 12/2016 |

\* cited by examiner

METHOD AND ARRANGEMENT FOR OUTPUTTING A HEAD-UP DISPLAY ON A HEAD-MOUNTED DISPLAY

CROSS-REFERENCE TO RELATED APPLICATIONS

This application claims priority to PCT Application No. PCT/EP2020/051273, having a filing date of Jan. 20, 2020, which is based off of DE Application No. 10 2019 202 512.9, having a filing date of Feb. 25, 2019, and DE 10 2019 201 175.6, having a filing date of Jan. 30, 2019, the entire contents all of which are hereby incorporated by reference.

FIELD OF TECHNOLOGY

The following relates to the output of a head-up display (HUD) on a head-mounted display (HMD).

BACKGROUND

The term "head-up display" (HUD) is used below in the meaning conventional in computer games. In this context, the HUD denotes virtual control elements and/or displays which are at least predominantly positioned at edges of the field of vision of a user.

In this case, the field of vision of the user denotes the region within which the user can fix his gaze on objects only by means of eye movements, that is to say without head movements, that is to say can see sharply with his visual center.

The term "head-mounted display" (HMD) denotes a visual output device which is worn on the head, for example VR glasses (for instance HTC Vive) or AR glasses (for instance Microsoft HoloLens), configured to visually output a virtual or augmented reality by displaying three-dimensional images.

In conventional computer games, the HUD is displayed in a stationary manner at edge regions of a screen. When outputting an HUD using an HMD, new avenues may need to be explored. In this context, the term "head-up display" (HUD) is also intended below to denote virtual control elements and/or displays which are at least predominantly positioned at edges of the field of vision of the user. This means that most elements of the HUD are positioned in a substantially stationary manner in head coordinates at the side in the field of vision of the user and are accordingly carried along in the case of head movements. In this case, the HMD forms the origin of the head coordinate system. Since they follow the head movements, the elements of the HUD move completely independently of virtual or real objects in world coordinates which may likewise be in the field of vision of the user.

The virtual control elements and/or displays are, for example, elements which are fundamentally known from graphical user interfaces. Suitable control elements are, for example, symbols, menus, buttons, checkboxes, option fields or list fields. Suitable displays are, for example, text fields, graphical status displays or images. The virtual control elements and/or displays may be in the form of two-dimensional (flat) or three-dimensional displays.

In the related art, the output of an HUD to a user using an HMD, wherein at least some elements of the HUD are displayed in a substantially stationary manner in head coordinates at the edge of a field of vision of the user even in the case of head movements, is perceived as disruptive in the virtual reality field since they may restrict the field of view.

There has therefore been a transition to affixing elements of the HUD to elements in world coordinates instead of positioning them in head coordinates. Such approaches are explained, for instance, in Joost Peters: "Designing a HUD for a Third-Person VR Game", Virtual Reality Developers Conference, November 2016, presentation available as a video on Jan. 9, 2019 on the Internet at https://youtu.be/f8an45s_-qs.

SUMMARY

An aspect relates to provide an alternative to the related art.

This is achieved, according to embodiments of the invention, by virtue of the fact that a computing unit outputs an HUD to a user using an HMD, wherein at least some elements of the HUD are displayed in a substantially stationary manner in head coordinates at the edge of a field of vision of the user even in the case of head movements. The method is characterized in that a tracking apparatus captures at least one hand and/or finger movement of the user as a gesture, and the computing unit detects and processes the gesture as interaction with at least one element of the HUD.

The arrangement for outputting an HUD using an HMD comprises an HMD and a computing unit which is programmed to output an HUD to a user using the HMD, wherein the output of at least some elements of the HUD is arranged in a substantially stationary manner in head coordinates at the edge of a field of vision of the user even in the case of head movements. The arrangement is characterized by a tracking apparatus configured to capture at least one hand and/or finger movement of the user as a gesture. The computing unit is programmed to detect and process the gesture as interaction with at least one element of the HUD.

Gesture-based interaction of the user is a direct interaction with the HUD. An indirect interaction with controllers within an arm's length in front of the user's face would be uncomfortable, unergonomic and also inaccurate. Therefore, there has never been an attempt to use VR controllers to control objects which are arranged in head coordinates. Direct interaction using the bare hand makes it possible for the user to operate elements of the HUD in a very intuitive manner even close to his face. Direct operation by accurately tracking the fingers of the bare hand has become possible by virtue of tracking apparatuses which have only recently appeared on the market, such as Leap Motion or the Microsoft HoloLens tracking system.

Direct interaction with the HUD by means of gestures signifies a disruptive break with previous approaches to implementing an HUD for VR and AR applications. Instead of departing from the placement of information in head coordinates, as pursued in the conventional art, the increased ergonomics of gesture-based interaction makes it possible to use the HUD to display information which is always intended to be available. The user is enabled to operate such menus intuitively using his bare hand in front of his face.

The computing unit of the arrangement is, for example, a processor, a notebook or a PC. The processor is, for example, a microprocessor or a microcontroller, a system-on-chip or a programmable digital module, for instance a "Field Programmable Gate Array" (FPGA).

According to one embodiment, interaction involves modifying an arrangement of the elements of the HUD on the basis of the gesture.

This embodiment signifies a disruptive departure from the conventional art in which the HUD is designed and implemented as a static arrangement. By virtue of the embodiment, it becomes possible for the user to move and rearrange elements of the HUD by means of direct gesture-based interaction.

In one development, the elements of the HUD are displayed at a distance from the user which does not exceed a range of the user's hands. The user touches an element of the HUD as a gesture, wherein the interaction actuates or selects the element, in particular.

The element is, for example, a button which is touched by the gesture.

According to one embodiment, the user carries out a swiping gesture in front of or on an element of the HUD as a gesture, wherein the interaction shifts and/or increases or decreases the size of the element.

This embodiment provides the advantage that the user can directly place elements of the HUD which are relevant to him prominently in his field of vision by means of gestures, while the user can shift elements of the HUD which are not important to him into the periphery.

In one development, the elements of the HUD are displayed at different distances in front of the user.

According to one embodiment, the user carries out a beckoning gesture in front of or on an element of the HUD as a gesture, wherein the interaction brings the element closer to the user and/or increases the size of the element.

In one development, the user carries out a dispelling gesture in front of or on an element of the HUD as a gesture, wherein the interaction moves the element away from the user and/or decreases the size of the element.

These two developments and the embodiment provide the advantage that a very complex HUD having a multiplicity of elements can be provided for the user without cluttering his field of vision. The spatial staggering similar to a stack of documents on a desk ensures additional organization.

According to one embodiment, the elements of the HUD follow head movements of the user with a temporal delay which is between 400 ms and 1200 ms. This is visualized by moving the elements against a direction of head movement in head coordinates during the temporal delay from the beginning of the head movement and then restoring the elements.

The temporal delay of between 400 ms and 1200 ms causes a significant increase in the ergonomics since the visual impression of the HUD becomes more natural for the user.

In one development, the tracking apparatus is mounted on the HMD.

A tracking apparatus suitable for this purpose is the Leap Motion product.

The computer-readable data storage medium stores a computer program which carries out the method when it is executed in a processor.

The computer program is executed in a processor and in the process carries out the method.

BRIEF DESCRIPTION

Some of the embodiments will be described in detail, with reference to the following figures, wherein like designations denote like members, wherein.

Figure 3:
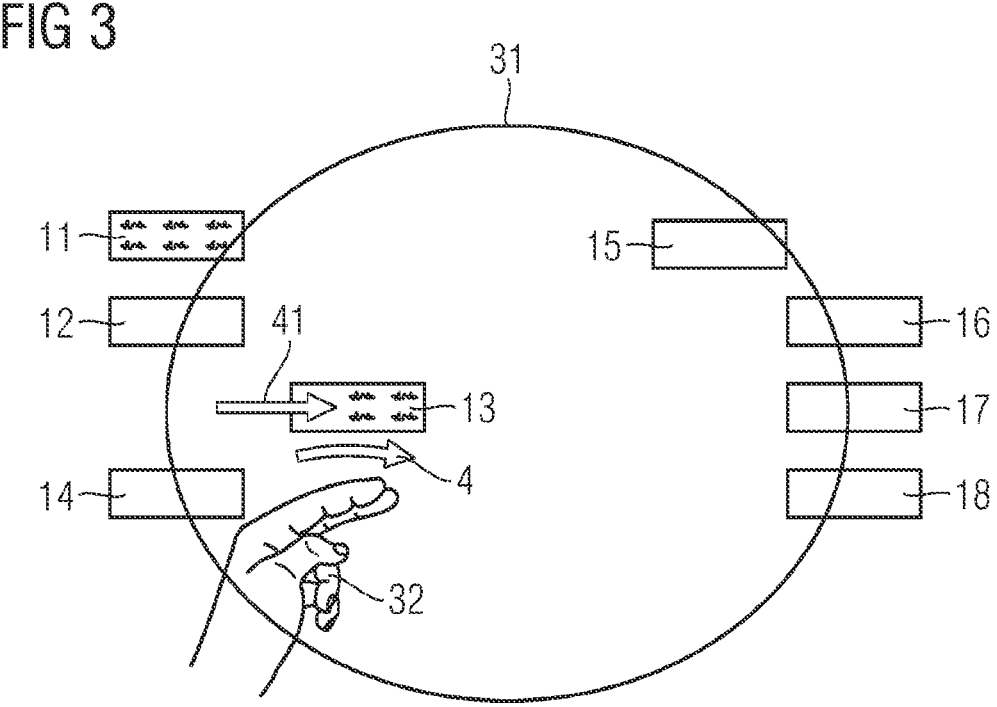
Figure 4:
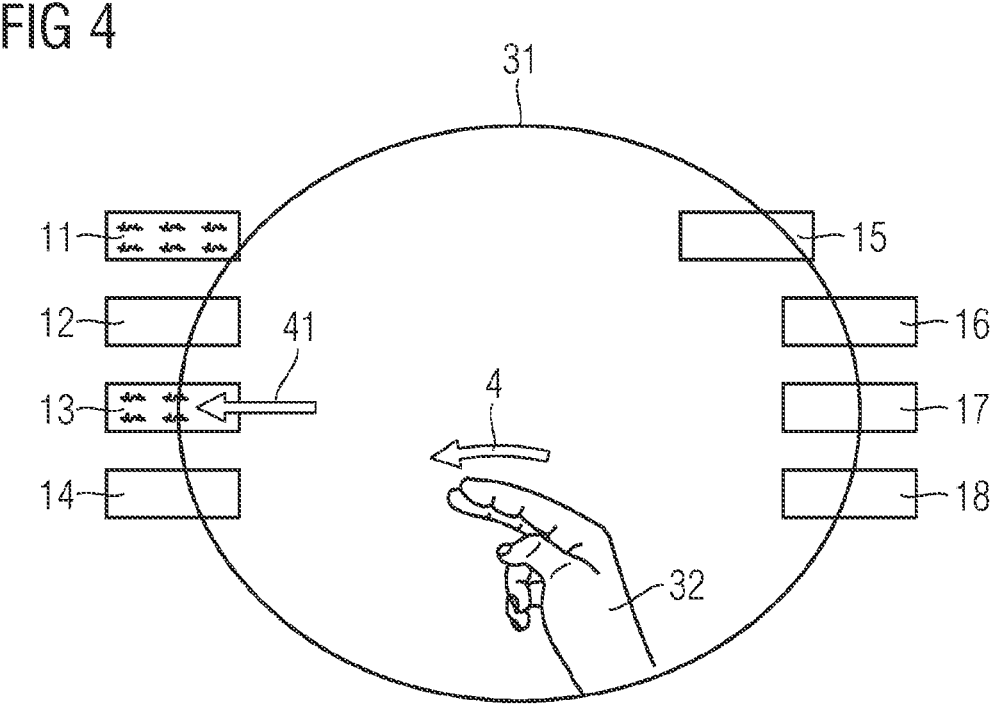
Figure 5:
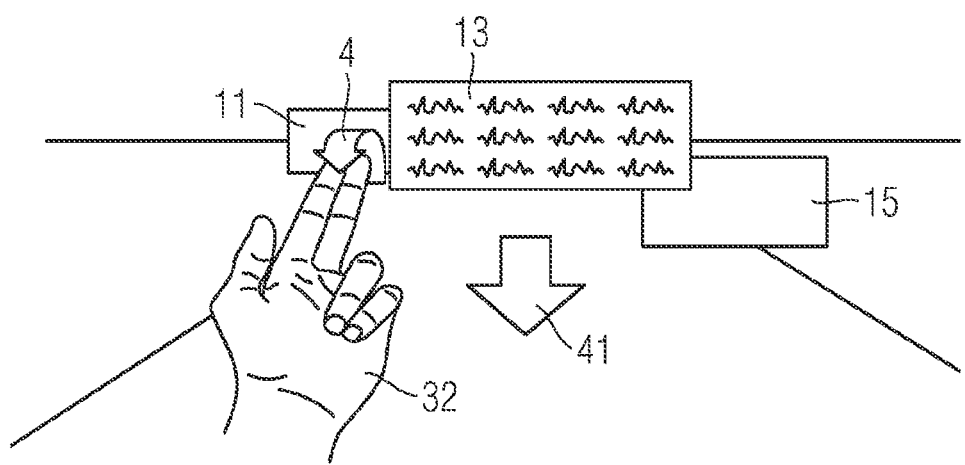

FIG. 3 shows a gesture 4 which is used by a user to move a third element 13 of an HUD into the center of his field of vision 31;

FIG. 4 shows a gesture which is used by a user to move a third element 13 of an HUD from the center of his field of vision 31; and FIG. 5 shows a gesture 4 which is used by a user to beckon a third element 13 of an HUD from the background.

DETAILED DESCRIPTION

Figure 1:
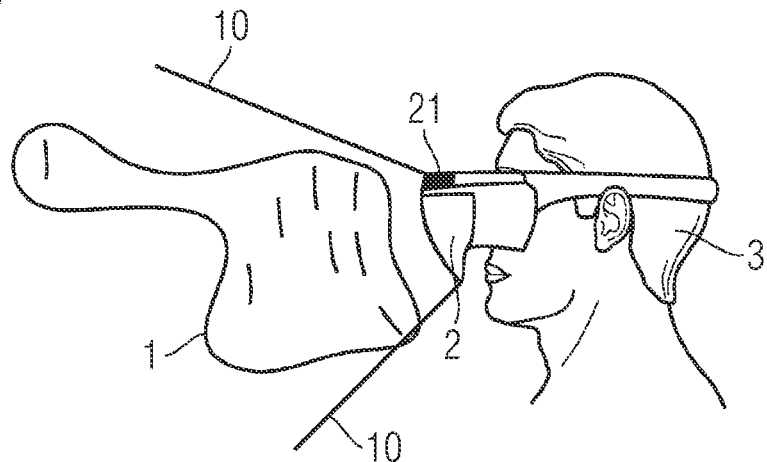
FIG. 1 shows an HUD 1 which is output to a user 3 using an HMD 2.

FIG. 1 shows an HUD 1 which is output to a user 3 using an HMD 2. The HUD 1 is displayed in a three-dimensional manner within a virtual display region 10 in front of the user 3. It consists of a number of flat fields or windows which are arranged in spatially staggered planes in front of the face of the user 3 in head coordinates.

The HMD 2 has a tracking apparatus 21 which could be used to capture and identify hand and/or finger movements of the user 3 as gestures. The Leap Motion product, which is placed on the outside of VR glasses, or the Microsoft HoloLens tracking technology is suitable for this purpose, for example.

The tracking apparatus 21 makes it possible for the user 3 to directly interact with the elements of the HUD 1 by means of his hand and/or finger movements in order to rearrange said elements, for example.

Figure 2:
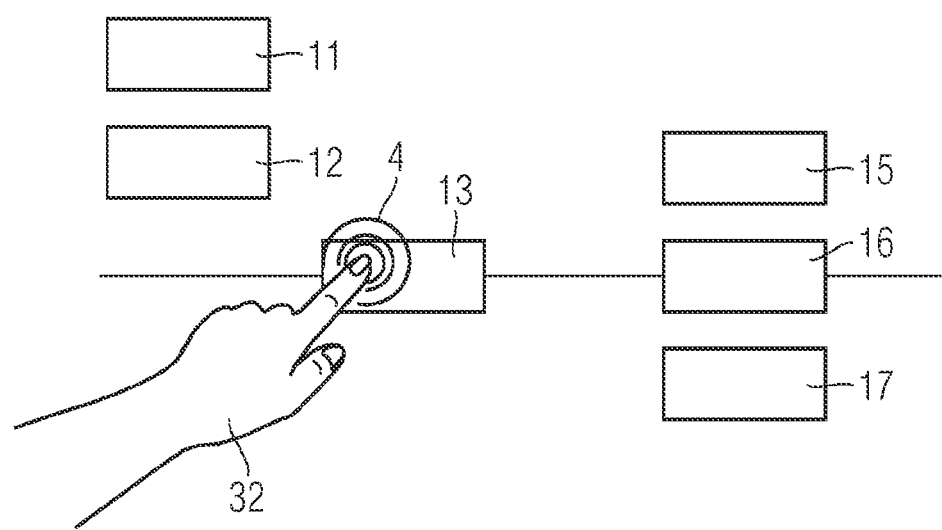
FIG. 2 shows a gesture 4 which is used by a user to actuate a third element 13 of an HUD.

FIG. 2 shows a gesture 4 which is used by a user to actuate or shift a third element 13 of an HUD using his hand 32. In this case, the third element 13 is displayed in front of the user in a plane with a first element 11, second element 12, a fifth element 15, a sixth element 16 and a seventh element 17. The plane is arranged so close to the user's face that the user can comfortably reach the plane with his fingertip. With the gesture 4 shown in FIG. 2, the user touches the third element 13 with his bare hand in front of his face. The interaction associated with this gesture could be, for example, selection of the third element 13 for future purposes, a drag-and-drop operation or the actuation of a button.

FIG. 3 shows a gesture 4, here a swiping gesture, which is used, as an interaction 41, to move a third element 13 of an HUD into the center of the user's field of vision 31. In addition to the elements from FIG. 2, a fourth element 14 and an eighth element 18 are also depicted. After carrying out the interaction 41, the third element 13 need not be in the center of the user's field of vision 31. It may also still be at the edge of the field of vision 31, but may be more central than the other elements which are further in the periphery. The user carries out the gesture 4, for example, in order to be able to better focus and read text which is displayed in the third element 13. In this manner, the user can keep his field of vision 31 substantially free and can move only the most important elements, such as the third element 13, into the center. Elements which are not required can also virtually disappear in the periphery, where the user can no longer fix his gaze on them; as shown in FIG. 3, most elements are only half in the user's field of vision. However, the user also sees the other half in a fuzzy manner in the corner of his eye provided that the field of view of the HMD permits this. In any case, the user can return the respective elements to his field of vision 31 by means of appropriate gestures in order to look at them more closely.

The elements contain, for example, control elements or displays, as are known from graphical user interfaces. Suitable control elements are, for example, symbols, menus, buttons, checkboxes, option fields or list fields. Suitable displays are, for example, text fields, graphical status displays or images. The elements may be in the form of two-dimensional (flat) or three-dimensional displays.

FIG. 4 shows a gesture 4 which is used by the user to at least partially remove a third element 13 of an HUD from his field of vision 31. The accordingly detected and performed interaction 41 is illustrated as an arrow.

FIG. 5 shows a further gesture 4 which is used by the user to beckon a third element 13 of an HUD from the background. After this gesture has been detected by the tracking apparatus 21, fetching of the third element 13 is identified and carried out as the associated interaction 41. Conversely, the user can move elements into the background using a dispelling gesture. In this manner, the user can also interact with elements which are initially not in the range of his hands. Furthermore, the user can organize stacks of elements in this manner, as a result of which the HUD is additionally structured and the user's field of vision is kept free in an improved manner.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for outputting an HUD using an HMD,
in which a computing unit outputs the HUD to a user using the HMD, wherein at least some elements of the HUD are continuously displayed in a substantially stationary manner in head coordinates such that the at least some elements of the HUD are in substantially fixed locations at the edge of a field of vision of the user and are continuously displayed even during head movements of the user,
wherein
a tracking apparatus captures at least one hand and/or finger movement of the user as a gesture,
the computing unit detects and processes the gesture as interaction with at least one element of the HUD, and
the elements of the HUD follow head movements of the user with a temporal delay which is between 400 ms and 1200 ms, wherein this is visualized by moving the elements against a direction of the head movements in head coordinates during the temporal delay from the beginning of the head movements and then restoring the elements.

2. The method as claimed in claim 1,
wherein interaction involves modifying an arrangement of the elements of the HUD on the basis of the gesture.

3. The method as claimed in claim 1,
in which the elements of the HUD are displayed at a distance from the user which does not exceed a range of the user's hands, and
in which the user touches an element of the HUD as a gesture.

4. The method as claimed in claim 1,
in which the user carries out a swiping gesture in front of or on an element of the HUD as a gesture, wherein the interaction shifts and/or increases or decreases the size of the element.

5. The method as claimed in claim 1,
in which the elements of the HUD are displayed at different distances in front of the user.

6. The method as claimed in claim 5,
in which the user carries out a beckoning gesture in front of or on an element of the HUD as a gesture, wherein the interaction brings the element closer to the user and/or increases the size of the element.

7. The method as claimed in claim 5,
in which the user carries out a dispelling gesture in front of or on an element of the HUD as a gesture, wherein the interaction moves the element away from the user and/or decreases the size of the element.

8. An arrangement comprising:
an HMD,
a computing unit which is programmed to output an HUD to a user using the HMD, wherein the output of at least some elements of the HUD is arranged in a substantially stationary manner in head coordinates such that the at least some elements of the HUD are continuously displayed in substantially fixed locations at the edge of a field of vision of the user even during head movements of the user,
wherein
a tracking apparatus configured to capture at least one hand and/or finger movement of the user as a gesture,
the computing unit is programmed to detect and process the gesture as interaction with at least one element of the HUD, and
the elements of the HUD follow head movements of the user with a temporal delay which is between 400 ms and 1200 ms, wherein this is visualized by moving the elements against a direction of the head movements in head coordinates during the temporal delay from the beginning of the head movements and then restoring the elements.

9. The arrangement as claimed in claim 8,
in which the tracking apparatus is mounted on the HMD.

10. A computer-readable non-transitory data storage medium,
which stores a computer program which carries out the method as claimed in claim 1 when executed in a processor.

11. A computer program product, comprising a computer readable hardware storage device having computer readable program code stored therein, the program code executable by a processor of a computer system to implement the method as claimed in claim 1.

* * * * *